(12) United States Patent
Fahs, II et al.

(10) Patent No.: US 9,073,766 B2
(45) Date of Patent: *Jul. 7, 2015

(54) METHODS FOR THE TREATMENT OF BALLAST WATER

(75) Inventors: Richard W. Fahs, II, Woodstock, CT (US); Matthew D. W. Fahs, Woodstock, CT (US)

(73) Assignee: Fahs Stagemyer, LLC, Woodstock, CT (US)

(*) Notice: Subject to any disclaimer, the term of this patent is extended or adjusted under 35 U.S.C. 154(b) by 507 days.

This patent is subject to a terminal disclaimer.

(21) Appl. No.: 13/404,929

(22) Filed: Feb. 24, 2012

(65) Prior Publication Data

US 2013/0056648 A1 Mar. 7, 2013

Related U.S. Application Data

(63) Continuation-in-part of application No. 12/861,524, filed on Aug. 23, 2010, now Pat. No. 8,202,500.

(60) Provisional application No. 61/236,592, filed on Aug. 25, 2009, provisional application No. 61/306,281, filed on Feb. 19, 2010, provisional application No. 61/315,262, filed on Mar. 18, 2010.

(51) Int. Cl.
*C02F 1/32* (2006.01)
*C02F 1/30* (2006.01)
(Continued)

(52) U.S. Cl.
CPC . *C02F 1/30* (2013.01); *C02F 1/725* (2013.01); *C02F 1/325* (2013.01); *C02F 1/36* (2013.01);
(Continued)

(58) Field of Classification Search
CPC ......... B01D 15/00; C02F 1/36; C02F 1/4608; C02F 1/46109; C02F 1/48; C02F 1/30; C02F 2001/46133; C02F 2103/008; C02F 2301/024; C02F 2301/026; C02F 2103/22; H05B 11/00
USPC .............. 422/20, 21, 22, 24, 186, 186.3, 128, 422/127; 250/428, 157.15, 432 R; 588/306
See application file for complete search history.

(56) References Cited

U.S. PATENT DOCUMENTS 4,828,718 A * 5/1989 Habermann et al. .......... 210/763
5,211,923 A 5/1993 Harkness
(Continued)

FOREIGN PATENT DOCUMENTS

EP 1041042 10/2004
GB 2356859 6/2001
(Continued)

OTHER PUBLICATIONS

Hegger, "Wastewater Treatment by Novel Hybrid Biological—Ion Exchange Process," University of Illinois, (2010).
(Continued)

*Primary Examiner* — Walter D Griffin
*Assistant Examiner* — Cameron J Allen
(74) *Attorney, Agent, or Firm* — Pabst Patent Group LLP

(57) ABSTRACT

A process has been developed to selectively dissociate target molecules into component products compositionally distinct from the target molecule, wherein the bonds of the target molecule do not reform because the components are no longer reactive with each other. Dissociation is affected by treating the target molecule with light at a frequency and intensity, alone or in combination with a catalyst in an amount effective to selectively break bonds within the target molecule. Dissociation does not result in re-association into the target molecule by the reverse process, and does not produce component products which have a change in oxidation number or state incorporated oxygen or other additives because the process does not proceed via a typical reduction-oxidation mechanism. This process can be used for the remediation of water, particularly ballast water.

23 Claims, 1 Drawing Sheet catalysts

(51) Int. Cl.
  *C02F 1/72* (2006.01)
  *C02F 1/36* (2006.01)
  *C02F 101/16* (2006.01)
  *C02F 103/00* (2006.01)
  *C02F 1/00* (2006.01)

(52) U.S. Cl.
  CPC ....... *C02F 2101/16* (2013.01); *C02F 2103/008* (2013.01); *C02F 2201/3226* (2013.01); *C02F 2201/326* (2013.01); *C02F 2305/10* (2013.01); *C02F 1/004* (2013.01); *C02F 2303/04* (2013.01)

(56) References Cited

U.S. PATENT DOCUMENTS

| | | | |
|---|---|---|---|
| 6,626,122 B2 * | 9/2003 | O'Reilly et al. | 114/74 R |
| 7,713,417 B2 | 5/2010 | Sutton | |
| 2003/0230537 A1 | 12/2003 | Taoda | |
| 2004/0195088 A1 | 10/2004 | Rostaing | |
| 2005/0040091 A1 * | 2/2005 | Nilsen et al. | 210/198.1 |
| 2007/0017794 A1 * | 1/2007 | Highgate et al. | 204/157.15 |
| 2008/0179178 A1 | 7/2008 | Cabello | |
| 2008/0314843 A1 * | 12/2008 | Foret | 210/748 |
| 2010/0028201 A1 | 2/2010 | Neister | |
| 2010/0200515 A1 | 8/2010 | Saien | |
| 2010/0224480 A1 | 9/2010 | Bloess | |
| 2010/0233777 A1 | 9/2010 | Chandran | |

FOREIGN PATENT DOCUMENTS

| | | |
|---|---|---|
| JP | 2004-323459 | 11/2004 |
| JP | 2007-144328 | 6/2007 |
| JP | 2008-105905 | 5/2008 |
| JP | 2006-239478 | 9/2008 |
| WO | 2006027659 | 3/2006 |
| WO | 2006134149 | 12/2006 |
| WO | 2009073003 | 6/2009 |
| WO | 2010099854 | 9/2010 |

OTHER PUBLICATIONS

Hong, et al, "Removal of Nitrogen by Immobilization Biological Activated Carbon (IBAC) Process," Study presented at the International Conference on Management and Service Science, 1-5 (2009).
Jianguo and Zhibin, "Experimental Study on Pretreatment of High Concentration Ammonia-Nitrogen Wastewater by TiO2 Photocatalysis," Presented at the 3rd International Bioinformatics and Biomedical Engineering Conference, (2009).
Li and Yang, "A Pilot Plant Study Using a Contact Oxidation Filtration Separation Integrated Bioreactor to Treat Municipal Wastewater," Study presented at the 4th International Conference on Bioinformatics and Biomedical Engineering, pp. 1-5 (2010).
Lin, et al. "Removal of ammonia nitrogen in wastewater by microwave radiation: a pilot-scale study", Journal of Hazardous Materials, 168(2-3):862-7 (2009).
Rui, "Ammonium Nitrogen Wastewater Treatment by Aerobic Granular Sludge Membrane Bioreactor," Study presented at the 2rd International Conference on Bioinformatics and Biomedical, Engineering, pp. 3469-3471 (2008).
Shahmoradi, et al, "Photocatalytic treatment of municipal wastewater using modified neodymium doped TiO2 hybrid nanoparticles," Journal of Environmental Science & Health, 45(10):1248-55 (2010).
Wang, et al, "Study on the Removal of NH3-N from the Ammonia Water in AS Process Using Fine Chemicals," Study presented at the 3rd International Conference on Bioinformatics and Biomedical, Engineering, Iss 1006-6780 (1998).
Xiao, et al, "Electrochemical process combined with UV light irradiation for synergistic degradation of ammonia in chloride-containing solutions," Water Research, 43(5):1432-40 (2009).
Yunnen, et al, "Equilibrium and Kinetics of Ammonia Nitrogen Biosorption from Wastewater by Spent Grains," Study presented at the 3rd International Conference on Bioinformatics and Biomedical Engineering , (2009).

* cited by examiner

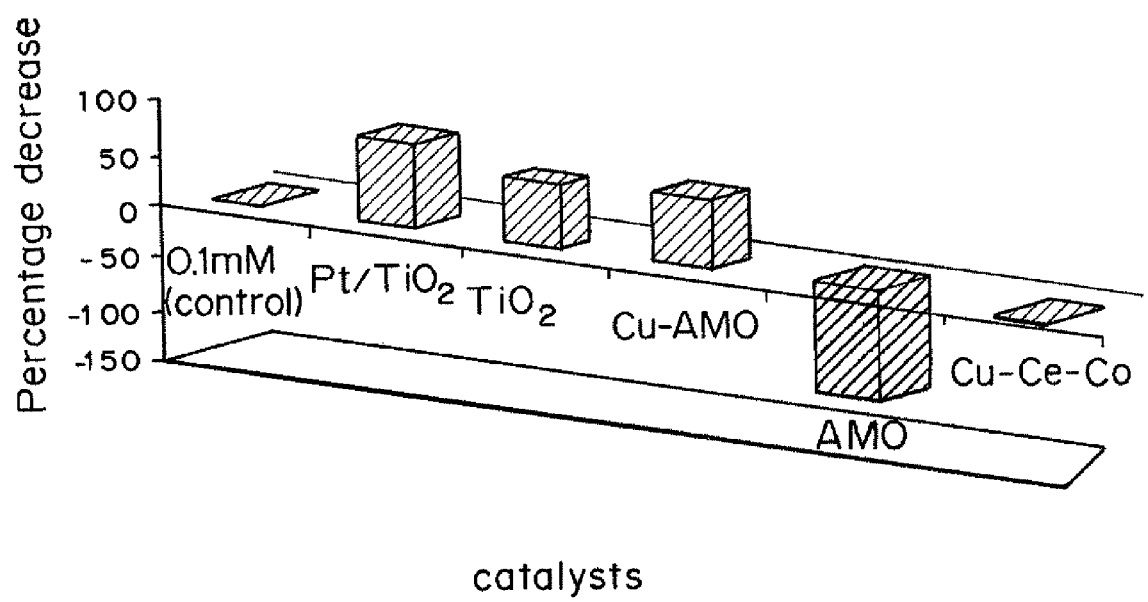

METHODS FOR THE TREATMENT OF BALLAST WATER

This application is a continuation-in-part of U.S. patent application Ser. No. 12/861,524, filed Aug. 23, 2010, which claims the benefit of and priority to U.S. Provisional Application Ser. No. 61/236,592 filed Aug. 25, 2009, U.S. Provisional Application Ser. No. 61/306,281 filed Feb. 19, 2010, and U.S. Provisional Application Ser. No. 61/315,262 filed Mar. 18, 2010. These applications are incorporated herein by reference.

FIELD OF THE INVENTION

The present invention relates to a process for dissociating target molecules into ions or elements, as well as methods of using this process for the remediation of water, particularly ballast water.

BACKGROUND OF THE INVENTION

Ballasting is a standard shipping practice. Upon departure from a port, ballast water is pumped into ballast tanks located in the hull of the ship. The ballast water provides additional weight to increase the stability and maneuverability of ships at sea. Ballast water is later discharged just before reaching the destination port to reduce the vessel's draft, allowing the ship to navigate in shallower water.

Though a common practice, ballasting has significant negative environmental consequences. During the loading of ballast water at the port of origin, pollutants and marine organisms present in the water column and harbor floor can be sucked into the ballast tanks of ships. Upon deballasting, these marine organisms and pollutants can then be released at the ship's destination.

Ballast water has been shown to harbor chemical pollutants, including volatile organic compounds (VOCs), as well as marine organisms ranging from microscopic organisms, such as plankton, bacteria, and protozoans, to macroscopic organisms, including shellfish and aquatic plant life. Aquatic invasive species (AIS) can be introduced into environments via ballast water with devastating environmental and economic consequences. The introduction of the zebra mussel into the Great Lakes of the United States is a well-publicized example of the environmental impact posed by AIS carried by ballast water.

To mitigate the potential impact of ballast water, ballast water can be treated before it is discharged. Existing methods for the remediation of ballast water are similar to methods used to treat water in other applications, and include chemical disinfection, ultraviolet (UV) irradiation, deoxygenation, microagitation, and electrochlorination. However, all of these existing methods for the remediation possess significant drawbacks.

Chemical disinfection involves contacting ballast water with a chemical disinfectant such as chlorine, ozone, peracetic acid, or menadione, prior to discharge. Because the disinfected ballast water is ultimately expelled from the vessel, the chemical disinfectant added to the ballast water, as well as any byproducts formed during ballast water treatment, are also discharged into the ocean. Absent additional remediation, chemically disinfected water can be destructive to ocean ecosystems. In addition, chemical disinfection requires the storage of hazardous chemicals on board ships, which takes up valuable storage space and presents significant risks to human health and the environment.

Ballast water can also be irradiated with ultraviolet (UV) light. However, this method requires the transmission of UV light through the ballast water. As a result, UV irradiation cannot effectively sterilize turbid water. In addition, UV irradiation of ballast water requires significant power consumption, and a large footprint in the case of systems requiring a high volumetric flow rate.

Deoxygenation involves removing all of the oxygen from ballast water prior to discharge in order to asphyxiate any marine organisms in the water. Deoxygenation is a lengthy process, typically requiring days to complete. In addition, water must be re-oxygenated prior to discharge. Finally, this method will not eliminate chemical pollutants, such as VOCs, or organisms that do not require oxygen to survive.

Microagitation involves the formation of microbubbles in a flowing liquid. The collapse of the microbubbles disrupts the cell walls of microorganisms, eliminating microorganisms present in the ballast water. However; microagitation is energy intensive, and requires careful engineering. In addition, microagitation will not eliminate chemical pollutants, such as VOCs, present in the ballast water.

In electrochlorination (also referred to as electrolytic disinfection), direct current is applied to the ballast water. Because seawater contains dissolved sodium chloride, the applied electric current forms sodium hypochlorite (i.e., bleach) which sterilizes the ballast water. This method is effective at neutralizing species in the ballast water and does not require the storage of hazardous chemicals. However, electrochlorination is energy intensive. Significant quantities of energy are required to form an effective concentration of bleach in ballast water. In addition, electrochlorination performance is reduced at temperatures between 10-15° C. [50-59° F.] and does not function at all below 5° C. [41° F.]. Therefore, additional energy is typically required to heat ballast water to above 15° C. [59° F.], a temperature range at which electrochlorination is efficient. Finally, electrochlorination systems typically discharge effluent containing bleach, which can be destructive to marine ecosystems.

Accordingly, there is a need for simple, effective safe, energy efficient, cost-effective, and environmentally benign methods for the remediation of water, particularly ballast water.

It is therefore the object of the invention to provide improved methods for the remediation of water, including ballast water.

It is further an object of the invention to provide methods for the remediation of water, including ballast water, which can simultaneously eliminate chemical pollutants and biological contaminants.

It is also an object of the invention to provide methods for the remediation of water, including ballast water, which can effectively eliminate chemical pollutants and biological contaminants without generating intermediates or byproducts which require further remediation.

It is also an object of the invention to provide methods for the remediation of water, including ballast water, which do not require the addition of chemical reagents.

SUMMARY OF THE INVENTION

Methods for the efficient remediation of water, including the ballast water in marine vessels, are simple, effective safe, energy efficient, cost-effective, and environmentally benign. The methods for the remediation of water involve the irradiation of water containing one or more biological contaminants, chemical contaminants, or combination thereof with energy at a frequency and intensity in an amount effective to selectively break one or more bonds within a target molecule. Any suitable energy source can be used to irradiate contaminated water, provided that the energy source provides energy at the desired frequency and intensity to dissociate one or more bonds within a given molecule. In preferred embodiments, the energy is in the form of light. In certain embodiments, a pulsed light of a particular frequency and intensity (e.g., a nano- or picosecond burst of light) or tunable laser is used to selectively induce photo-dissociation of one or more target molecules to eliminate one or more contaminants present in the water. The water can be irradiated by energy in the absence of a catalyst. Alternatively, the water can be irradiated in the presence of a catalyst. In embodiments where a catalyst is used, the catalyst can be dispersed throughout the water or immobilized on a heterogeneous support.

In the case of water containing a chemical contaminant, the target molecule is typically a chemical pollutant, such as volatile organic compound, present in the water. In order to eliminate a chemical contaminant from a water sample, energy is introduced at a frequency and intensity to selectively dissociate one or more target bonds in the target molecule, causing the target molecule to dissociate into component products compositionally distinct from the target molecule. Generally, the bonds of the target molecule do not reform because the components are no longer reactive with each other. The process does not produce component products by oxidation or reduction process, an exchange of electrons, or a change in oxidative state of the molecule which have incorporated oxygen or other additives because the process does not proceed via a typical reduction-oxidation mechanism.

In the case of water containing a biological contaminant, the target molecule may be a portion of a biomolecule which is itself a contaminant present in the water, such as a protein, polysaccharide, or polynucleotide, or a portion of a biomolecule, such as a protein, DNA, or RNA, located within an infectious agent or organism contaminating the water. Energy is introduced at a frequency and intensity to selectively dissociate one or more target bonds in the target molecule, causing the target molecule to dissociate into component products compositionally distinct from the target molecule. Generally, the bonds of the target molecule do not reform because the components are no longer reactive with each other. In the case of biological contaminants such as infectious agent and organisms, the target molecule will preferably be a portion of a biomolecule essential for the function and/or survival of the infectious agent or organism. By selectively dissociating one or more target bonds in the target molecule, the infectious agent or organism is selectively killed or rendered inactive using the method. In certain embodiments, sample containing one or more biological contaminants is sterilized using the method.

By irradiating a contaminated water sample with energy at specific frequencies and intensities, target molecules can be selectively dissociated in a complex mixture. In some embodiments, water is irradiated with energy at multiple discrete frequencies and intensities in order to selectively dissociate one or more bonds within multiple different target molecules. For example, a water sample can be irradiated to simultaneously eliminate both chemical pollutants and biological contaminants in a water sample.

In certain embodiments, the method effectively eliminates chemical pollutants, biological contaminants, and combinations thereof in a contaminated water sample without generating intermediates or byproducts which require further remediation. The method can further include purification, for example, to remove the resultant component products or remove catalyst, if present.

The method can be used to remediate contaminated samples, especially wastewater treatment, liquid effluents (e.g. wastewater, aquaculture water, ballast water, industrial runoff, and agricultural runoff) which contains at least one undesirable or otherwise unwanted biological or chemical contaminant. In other embodiments, the method is used to remediate solid waste, sludge waste, biomedical waste, landfill waste, and polluted soil.

In certain embodiments, ballast water containing one or more chemical contaminants, biological contaminants, or combinations thereof is remediated with irradiated energy at a frequency and intensity in an amount effective to selectively break one or more bonds within one or more target molecules. In doing so, one or more chemical contaminants, biological contaminants, or combinations thereof present in the ballast water are eliminated or otherwise rendered environmentally benign. Preferably, the ballast water is irradiated during ballast water discharge. Preferably, the energy source for ballast water irradiation is incorporated into the means for ballast water discharge, such that ballast water treatment operates interruption-free with a high volumetric flow rate of water. In certain embodiments, the ballast water treatment operates interruption-free with a volumetric flow rate of greater than 1,000 cubic meters per hour, more preferably greater than 2,500 cubic meters per hour, more preferably greater than 4,000 cubic meters per hour, more preferably greater than 5,000 cubic meters per hour, most preferably greater than 6,000 cubic meters per hour. In certain embodiments, this method further involves filtration of the ballast water to remove macroscopic contaminants.

In certain embodiments, the method effectively eliminates chemical pollutants and biological contaminants in ballast water without generating intermediates or byproducts which require further remediation. In certain embodiments, the method effectively eliminates chemical pollutants and biological contaminants in ballast water without requiring the addition of chemical reagents and/or the heating or cooling of ballast water.

BRIEF DESCRIPTION OF THE DRAWINGS

FIG. 1 is a bar graph of the percentage decrease of aqueous ammonia after photocatalytic degradation. The results are achieved with the following catalysts: $Pt/TiO_2$ (platinized titania), $TiO_2$ (Titanium oxide), Cu-AMO (Copper-doped Amorphous Manganese Oxide), AMO (Amorphous Manganese Oxide), and Cu—Ce—Co (Copper-Cerium-Cobalt).

DETAILED DESCRIPTION OF THE INVENTION

I. Definitions and Mechanisms

An atom is ionized by absorbing a photon of energy equal to or higher than the ionization energy of the atom. Multiple photons below the ionization threshold of an atom may combine their energies to ionize an atom by a process known as multi-photon ionization. These concepts also apply to molecules. Resonance enhanced multi-photon ionization (REMPI) is a technique in which a molecule is subject to a single resonant or multi-photon frequency such that an electronically excited intermediate state is reached. A second photon or multi-photon then ejects the electronically excited electron and ionizes the molecule.

Among a mixture of molecules with different bond dissociation energies, selective activation of one chemical bond requires a mono-chromatic source. For example, in a compound containing N—H (bond dissociation energy of 3.9 eV) and C—H (bond dissociation energy of 4.3 eV) bonds, a specific photon source of 4.0 eV dissociates the N—H bond exclusively.

The process described herein relies on two main principles. The first principle is that the dissociation of target molecules requires breaking multiple bonds. Thus, a plurality of photons or other energetic sources are absorbed by a given molecule. The second principle is that dissociation of molecules in a complex mixture can be achieved with specific selection of the energy for dissociation (both frequency and intensity), defined herein as the promoter.

"Biological contaminant," as used herein, refers to an undesirable contaminant of biological origin. The term "biological contaminant" encompasses biomolecules, such as proteins, polysaccharides, and polynucleotides, infections agents, such as viruses, as well as single and multi-celled organisms, such as bacteria, protozoa, plankton.

"Bond dissociation energy," as used herein, refers to the standard enthalpy change when a bond is homolytically cleaved.

"Bond energy," as used herein, refers to the average of the sum of the bond dissociation energies in a molecule.

"Component products," as used herein, refers to known ions or atoms composed of only elements found within the target molecule. Individual component products have a chemical formula distinct from the target molecule. An example is $N_2$ and $H_2$, which are each component products of $NH_3$.

"Catalyst," as used herein refers, to any chemical which enhances the rate and/or efficiency of molecular dissociation compared with the rate and/or efficiency of dissociation in the absence of the catalyst.

"Chemical waste," as used herein, refers to any inorganic or organic substance, present in any physical state, that is unwanted in a given sample due to environmental or toxicity concerns.

"Dissociation," as used herein, refers to breaking the bonds of a molecule. Dissociation in the current process is requires that the original bonds of the target molecule do not re-associate.

"Excited state," as used herein, refers to a state in which one or more electrons of an atom or molecule are in a higher-energy level than ground state.

"Irradiation," as used herein, refers to exposing a sample to beams of particles or energy, such as a form of electromagnetic or acoustic radiation. In certain embodiments, irradiation involves exposing a sample to light.

"Nanoparticle", as used herein, refers to particle or a structure in the nanometer (nm) range, typically from about 0.1 nm to about 1000 nm in diameter.

"Non-target molecule," as used herein, refers to the any substance within a sample containing target molecules which is not affected by the process.

"Promoter," as used herein refers, to the energy required for dissociation of a target bond, which is both selective for the target bond and sufficient to prevent re-association of the bond.

"Energy of dissociation source," as used herein, refers to any chemical, apparatus, or combination thereof, which supplies the energy of dissociation with the energy required to dissociate target bonds within a target molecule. The energy of dissociation source must supply suitable intensity and suitable frequency for target bond dissociation. An example of a energy of dissociation source is a xenon lamp coupled to a pulse generator. A energy of dissociation source can optionally contain a catalyst. An example of such an energy of dissociation source is a titanium dioxide catalyst and a xenon lamp coupled to a pulse generator.

Precise Energy Separation (PES) Technology is the use of highly specific energy to selectively cleave specific bonds to dissociate a target.

"Remediation," as used herein, refers to treatment of water, such as ballast water, wastewater, or drinking water, to decrease the concentration of one or more undesirable contaminants. The contaminants can be biological or chemical contaminants.

"Sample" as generally used herein refers to at least one target molecule which is subjected to the dissociation process. A sample can comprise both target and non-target molecules.

"Target bond," as used herein, refers to any bond within a target molecule. Target bonds can be covalent (including single and multiple covalent bonds), ionic, or "weak bonds" including dipole-dipole interactions, London dispersion forces, or hydrogen bonding. In certain embodiments, the target bonds are covalent bonds.

"Target molecule" as used herein refers to a molecule, or portion of a macromolecule, that contains at least one bond.

"Volatile organic compound" (VOC), as used herein, refers to organic compounds with high enough vapor pressure to evaporate and enter the atmosphere at ambient temperature and pressure. Examples of VOCs include low-molecular weight organic compounds such as alcohols, esters, ethers, aldehydes, thiols, and ketones.

"Ballast water" refers to fresh or salt water, sometimes containing sediments, held in tanks and cargo holds of ships to increase stability and maneuverability during transit. Ballast water taken into a tank from one body of water and discharged in another body of water can introduce invasive species of aquatic life. The discharge of water from ballast tanks has been responsible for the introduction of species that cause environmental and economic damage. The International convention for the control and management of ships' ballast water and sediments in 2004 tries to deal with this environmental problem, by regulating the discharge and charge of ballast water. Boats must comply with the regulations in effect and change their ballast water when they sail in high sea. The exchange should be made by high depth (more than 2000 meters) so far as possible, during the day and as far away from the littoral as possible. To avoid stability or mechanical stress problems, there are two options for the replacement of ballast water empty the whole tank and fill it, or without emptying the tank, proceed with the filling by allowing the overflow to come out by the air outflow, in which case three times the volume of the tank has to be exchanged.

II. Target Compositions

Methods for remediation of contaminated samples, such as water samples, involve the irradiation of a sample containing one or more biological contaminants, chemical contaminants, or combinations thereof with energy at a frequency and intensity in an amount effective to selectively break one or more bonds within a target molecule(s).

A. Target Molecules

The methods described herein are used to dissociate one or more bonds in almost any molecule, permitting the remediation of virtually any chemical and/or biological contaminant.

Target molecules must contain at least one bond to be dissociated. Target molecules can be any compound which is a water contaminant or a portion of a water contaminant. Target molecules can be charged or uncharged. Target molecules can be naturally occurring or synthetically prepared compounds.

In some cases, the target molecule is a chemical contaminant, such as volatile organic compound, present in the sample. Examples of chemical contaminants that can be targeted using the methods described herein include alkyl sulfonates, alkyl phenols, ammonia, benzoic acid, carbon monoxide, carbon dioxide, chlorofluorocarbons, dioxin, fumaric acid, grease, herbicides, hydrochloric acid, hydrogen cyanide, hydrogen sulfide, formaldehyde, methane, nitrogenous wastes (e.g., sewage, waste water, and agricultural runoff), nitric acid, nitrogen dioxide, ozone, pesticides, polychlorinated biphenyls, oil, ozone, sulfur dioxide, and sulfuric acid. Target molecules can be reactive or volatile aliphatic or aromatic organic compounds. In certain embodiments, the target molecule is a low-molecular weight organic compound, such as an alcohol, ester, ether, aldehyde, thiol, carboxylic acid, amine, amide, or ketone. The target molecule can also be a pharmaceutically active compound, or metabolite thereof.

In the case of samples containing a biological contaminant, the target molecule may be a portion of a biomolecule which is itself a contaminant present in the water, such as a protein, polysaccharide, or polynucleotide. The target molecule may also be a portion of a biomolecule, such as a protein, DNA, or RNA, located within an infectious agent or organism contaminating the sample. In the case of biological contaminants such as infectious agents and organisms, the target molecule will preferably be a portion of a biomolecule essential for the function and/or survival of the infectious agent or organism. By selectively dissociating one or more target bonds in the target molecule, the infectious agent or organism is selectively killed or rendered inactive using the method.

In some embodiments, the sample contains exclusively target molecules. In other embodiments, one or more target molecules are present in a sample with one or more non-target molecules. In these cases, the one or more target molecules can be selectively dissociated in a complex mixture. By way of illustration, in the case of a sample containing ammonia (a target molecule) in water, the method is used to selectively dissociate ammonia into $N_2$ and $H_2$ without dissociating water molecules into $O_2$ and $H_2$. In this case, water is not dissociated because the sample is irradiated with energy having the intensity and frequency required to dissociate the N—H bonds of ammonia and not the O—H bonds of water.

B. Target Bond

A target bond is any bond within a target molecule. Types of bonds affected by the dissociative process described herein include covalent, ionic, van der Waals, hydrogen bonding, or London dispersion forces or any bond which can form and has dissociation energy or energies if applied will break the bond and not allow the reformation of the bond.

Generally, the target bond is a covalent bond. The covalent bond can be a single bond, double bond, or triple bond. A non-limiting list of exemplary target bonds include N—H, C—H, C—C, C=C, C≡C, C—N, C=N, C≡N, C—O, C=O, C≡O, O—H, O—P, O=P, and C—X bonds, where X is any halogen selected from chlorine, fluorine, iodine, and bromine.

The energy of dissociation must be specific for the target bond of the target molecule. Bond dissociation energies are well known in the art. Examples of bond dissociation energies include H—H, 104.2 kcal/mol; B—F, 150 kcal/mol; C=C, 146 kcal/mol; C—C, 83 kcal/mol; B—O, 125 kcal/mol; N=N, 109 kcal/mol; N—N, 38.4 kcal/mol; C—N, 73 kcal/mol; O=O, 119 kcal/mol; O—O, 35 kcal/mol; N—CO, 86 kcal/mol; C=N, 147 kcal/mol; F—F, 36.6 kcal/mol; C—O, 85.5 kcal/mol; C=O (CO2), 192 kcal/mol; Si—Si, 52 kcal/mol; O—CO, 110 kcal/mol; C=O (aldehyde), 177 kcal/mol; P—P, 50 kcal/mol; C—S, 65 kcal/mol; C=O (ketone), 178 kcal/mol; S—S, 54 kcal/mol; C—F, 116 kcal/mol; C=O (ester), 179 kcal/mol; Cl—Cl, 58 kcal/mol; C—C, 181 kcal/mol; C=O (amide), 179 kcal/mol; Br—Br, 46 kcal/mol; C—Br, 68 kcal/mol C=O (halide), 177 kcal/mol; I—I, 36 kcal/mol; C—I, 51 kcal/mol; C=S(CS2), 138 kcal/mol; H—C, 99 kcal/mol; C—B, 90 kcal/mol; N=O (HONO), 143 kcal/mol; H—N, 93 kcal/mol; C—Si, 76 kcal/mol; P=O (POCl3), 110 kcal/mol; H—O, 111 kcal/mol; C—P, 70 kcal/mol; P=S (PSCl3), 70 kcal/mol; H—F, 135 kcal/mol; N—O, 55 kcal/mol; S=O (SO2), 128 kcal/mol, H—Cl, 103 kcal/mol; S—O, 87 kcal/mol; S=O (DMSO), 93 kcal/mol; H—Br, 87.5 kcal/mol; Si—F, 135 kcal/mol; P=P, 84 kcal/mol; H—I, 71 kcal/mol; Si—Cl, 90 kcal/mol; P≡P, 117 kcal/mol; H—B, 90 kcal/mol; Si—O, 110 kcal/mol; C≡O, 258 kcal/mol; H—S, 81 kcal/mol; P—Cl, 79 kcal/mol; C≡C, 200 kcal/mol; H—Si, 75 kcal/mol; P—Br, 65 kcal/mol; N≡N, 226 kcal/mol; H—P, 77 kcal/mol; P—O, 90 kcal/mol; C≡N, 213 kcal/mol.

In one embodiment, target bonds are dissociated heterolytically by the process described herein. When heterolytic cleavage occurs, ionic component products may be produced in addition to radicals and ejected electrons, for example:

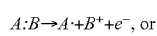

$A:B \rightarrow A \cdot + B^+ + e^-$, or

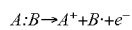

$A:B \rightarrow A^+ + B \cdot + e^-$

The radicals can re-associate to form A:B, but in the preferred embodiment, the radicals re-associate in a homomeric fashion to form A:A and B:B component products. One, two, or more identical radicals can associate to form known ions, atoms, or molecules.

In some embodiments, target molecules contain multiple non-identical atoms, multiple oxidation states, or combinations thereof, all of which contain a variety of types of target bonds. Examples of target molecules with non-identical target bonds containing multiple non-identical atoms are dichloroethane ($CH_2Cl_2$) and ethanolamine ($OHCH_2CH_2NH_2$).

Examples of target molecules with non-identical target bonds with multiple oxidation states include ethyl acetylene HC≡CH$_2$CH$_3$ and ethyl isocyanate ($CH_3CH_2N=C=O$).

In some embodiments, the target molecule is present in a range from 1 part per billion (ppb) or lower to very high concentrations. Those skilled in the art will recognize the energy of dissociation intensity and duration of energy of dissociation treatment will need to be adjusted based on concentration of target molecules in a sample. Higher concentrations of target molecules are successfully dissociated by increasing energy of dissociation power (wattage), increasing exposure time to the promoter, or a combination thereof.

Those skilled in the art will also recognize the energy of dissociation intensity and duration of energy of dissociation treatment will need to be adjusted based on the exposure time of the contaminated sample to the promoter.

III. Energy of Dissociation and Energy Sources

The energy of dissociation is the energy required for dissociation of a target molecule, and is specific for the target bond or bonds within a target molecule. The energy of dissociation is tunable and specific for the bond dissociation energy of any target bond within any target molecule.

The energy of dissociation is applied at a frequency and intensity effective for both scission of the target bond and target molecule dissociation.

In an example, the target molecule is AB, and application of the energy of dissociation specific for the A-B bond results in ejection of an electron from the target bond yielding a radical, an ion, and an electron, according to the following possible mechanisms:

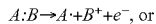, or

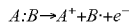

The ions and radicals can be stable insoluble species, or can combine with other ions to form molecules, i.e. the component products. The ejected electrons can be captured by an electron sink. The intensity of the energy of dissociation must be such that re-association of components back into the target molecules does not occur.

In one embodiment, application of the energy of dissociation satisfies the bond dissociation energy of the target bond of a target molecule via a one step electronic process, and the target bond is dissociated. Once one target bond has been dissociated, the energy of dissociation source can be tuned to the frequency of a second target bond dissociation energy and applied to the sample to affect dissociation of a second target bond. The energy of dissociation sources can be tuned as needed to dissociate all target bonds of the target molecule. There are numerous apparatuses that can provide multi-energy or photons within a nano second or quicker to effect irreversible dissociation and prevent formation of reactants from the dissociated target molecule components.

In another embodiment, application of the energy of dissociation satisfies the bond dissociation energy of the target bond of a target molecule via a process involving the Rydberg excited state of the target molecule. First, the energy of dissociation source excites the target molecule to a Rydberg state, wherein the energy required to nearly remove an electron from the ionic core (the ionization or dissociation energy) of a target molecule has been achieved. Next, the same or different energy of dissociation source then supplies sufficient energy to eject the excited electron from the target bond. In this embodiment, one or more energy of dissociation sources can be used for each step. Once one target bond has been dissociated, the energy of dissociation source can be tuned to the frequency of a second target bond dissociation energy. The energy of dissociation sources can be tuned as needed to dissociate all target bonds of the target molecule.

For example, treatment of ammonia with an energy of dissociation occurs via the two-step process involving the Rydberg State. First, energy of dissociation treatment of 193 nm excites a shared electron in the N—H bond such that ammonia is in an excited Rydberg state. Subsequent energy of dissociation treatment of 214 nm energy expels the electron and dissociates ammonia into $NH_2^-$ and H·Subsequent dissociative processes will give component products which re-associate to form $N_2$ and $H_2$.

In one embodiment, the one-step process, the two-step process, or a combination thereof are used to dissociate the target molecule. In one embodiment, one or more energy of dissociation sources are used for dissociation of each target bond within a target molecule. In one embodiment, one or more energy of dissociation sources are used in combination for dissociation of each target bond within a target molecule.

An exemplary molecule contains N—H, C—O, and O—H bonds. The N—H bond is cleaved with application of a 193 nm and 214 nm xenon bulb energy of dissociation source. The C—O bonds are cleaved with a mono-chromatic pulse generator. The O—H bonds are cleaved with a combination of photocatalyst and UV radiation. AU of these energy of dissociation sources comprise the energy of dissociation required for complete dissociation of all the bonds of the target molecule. In some cases this requires three or more bond energies to expel the electron. In some cases, a filter may be used to isolate wavelengths or energies from a wide range source.

A. Energy of Dissociation Sources

An energy of dissociation source provides the energy of the promoter. The energy of dissociation source delivers irradiative energy, catalysis, or combinations thereof. An energy of dissociation source supplies the energy of dissociation with electromagnetic energy, acoustic energy, or any other energy which meets the bond dissociation energy of the target bond. The energy of dissociation source energy is selected from a non-exclusive list including photonic, photo-catalytic, chemical, kinetic, potential, magnetic, thermal, gravitational, sound, light, elastic, DC or AC modulation current (electrical), plasma, ultrasound, piezoelectric, or electrochemical energy.

Energy of dissociation sources include any apparatus which can supply the specific bond dissociation energy to break target bonds of target molecules specifically without non-target molecule bonds being affected. Examples include mono-chromatic light, monotone sound, or any other mono-energy source.

In one embodiment, an energy of dissociation source is applied at the appropriate frequency and intensity to attain a multi-photon or multi-frequency energy of dissociation within a rapid time scale through use of a generator of nano to pico-pulse cycles.

In some embodiments, energy of dissociation sources can be frequency generators, electrical generators, plasma generators, arc lamps, pulse generators, amplifying generators, tunable lasers, ultraviolet lamps, ultraviolet lasers, pulse ultraviolet generators, and ultrasound generators.

In some embodiments, the energy of dissociation source is one or more reactor beds having any number of lamps, generators, and/or bulbs; lamps, generators, and/or bulbs having the same or different sizes in terms of diameter and length; lamps, generators, and/or bulbs having the same or different wattages and/or any combination of the foregoing. The lamps, generators, and/or bulbs useful in this method can be any shape, size, or wattage. For example, a pulse light source allows one to use a 10 watt input of energy and generate 400,000 watts of pulse energy within ⅓ of a second of output, thereby reducing energy usage and equipment size and cost.

In preferred embodiments, the energy of dissociation source is a pulse tunable laser or diode attached to a pulse generator.

Those skilled in the art will recognize the nature of the target bond and target molecule will determine the identity, frequency, and intensity of energy of dissociation source.

In one embodiment, photocatalytic processes use ultraviolet light promoters, supplied by ultraviolet energy of dissociation sources that are positioned to emit photons of ultraviolet light. The ultraviolet light sources are generally adapted to produce light having one or more wavelengths within the ultraviolet portion of the electromagnetic spectrum. However, the method should be understood as including ultraviolet light sources that may produce other light having one or more wavelengths that are not within the ultraviolet portion (e.g., wavelengths greater than 400 nm) of the electromagnetic spectrum.

In other photocatalytic processes, the energy of dissociation source is replaced by other devices, such as lamps or bulbs other than ultraviolet fluorescent lamps or bulbs; non-ultraviolet light emitting diodes; waveguides that increase surface areas and direct ultraviolet light and any energy light source that activates a photocatalyst; mercury vapor lamps; xenon lamps; halogen lamps; combination gas lamps; and microwave sources to provide sufficient energy to the photocatalyst substance to cause the bond dissociation to occur.

In one embodiment, the photocatalyst is applied to the surface of a fiber optic device and activated from the inside by the specific energy of dissociation. The fiber optic device can be placed into a membrane through which air, solids or liquids flows.

B. Energy of Dissociation Source Intensity

Energy of dissociation source intensity is the quantity of energy supplied to the promoter, which treats a target molecule. Energy of dissociation source intensity is directly proportional to the number and percentage of bonds which can be dissociated. Low intensity energy of dissociation sources have the capability to dissociate a smaller proportion of target bonds compared to higher intensity energy of dissociation sources. For example, in a photonic energy of dissociation source, the greater the number of photons present, the higher the likelihood of ejecting electrons.

In one embodiment, energy of dissociation source intensity is increased by use of a pulse generator in conjunction with a lamp of the proper wavelength, or a tunable laser. In a preferred embodiment, the pulse generator supplies a predetermined number of pulses per second.

C. Energy of Dissociation Source Frequency

The frequency of energy of the energy of dissociation source (in photonic cases, the wavelengths of radiant energy) specifically dissociates target bonds of target compounds. One frequency, multiple selected frequencies, or combinations of energy of dissociation source frequencies can be used depending on the chemical structure of the target material. The apparatus must deliver sufficient intensity of the dissociation energy to completely dissociate the bond in adequate numbers to satisfy the need of the end user.

Methods of determining the appropriate frequency at which a target bond can be dissociated is known in the art, and include resonance enhanced mule-photon ionization (REMPI) spectroscopy, resonance ionization spectroscopy (RIS), photofragment imaging, product imaging, velocity map imaging, three-dimensional ion imaging, centroiding, zero electron kinetic imaging (ZEKE), mass enhanced threshold ionization (MATI), and photo-induced Rydberg ionization (PIRI).

Wavelengths to dissociate hydrogens from ammonia are 193, 214, 222, 234 and 271 nm. Three or more of these wavelengths in combination break $NH_3$ into its components: $N_2$ (g) and $H_2$ (g) without producing ozone, Examples of wavelengths for dissociation include 193 nm and 214 nm, both of which are required. A wavelength of 248 nm will break down Ozone. In a preferred embodiment, the energy of dissociation source frequency range is from 115 nm to 400 nm, with appropriate filters, to satisfy the precise frequency of dissociation energies required for hydrogen dissociation only. Adjustments are made for cage effect and molecular interaction.

In one embodiment, the energy of dissociation source frequency is supplied by a tunable laser or light energy source that subjects samples to a mono-energy.

If the proper dissociation bond energy at a sufficient intensity to dissociate a selected bond or group of bonds is applied, there are no indiscriminate or random molecules or atoms produced other than what will be determined by the selected bonds which are targeted for dissociation, eliminating the random production of undesirable by-products or intermediates seen in oxidation and reduction, microbial or indiscriminate chemical reaction. An electron sink can also be added to the process to insure that there is no recombination or potential for intermediate or by-product production.

D. Catalysts

In one embodiment, the energy of dissociation source includes a catalyst. The catalyst enhances the rate of bond dissociation. The catalyst can be any material of any physical configuration which is compatible with the sample and any other energy of dissociation sources. Catalysts may be unifunctional, multifunctional, or a combination thereof. Catalysts can be used alone or in combination with other catalysts. The catalyst is used to drive the reaction to 100% completion, i.e., dissociating generally every ammonia molecule into nitrogen and hydrogen. The catalyst is applied to the target molecule or an interface between the energy source and the target molecule wherein the target molecule contacts the catalyst. Catalyst is applied to a surface (such as a nanoparticle or tube), or dispersed into a liquid or suspension, through which the energy passes to the target molecules.

In a preferred embodiment, an energy of dissociation source includes a photocatalyst and photonic (light-based) energy source. The photocatalyst provides an effective means for converting light into chemical energy. The catalyst or photocatalyst is semi-conductive material such as titanium oxides, platinized titania, amorphous manganese oxide, and copper-doped manganese oxide, titanium dioxide, strontium titanate, barium titanate, sodium titanate, cadmium sulfide, zirconium dioxide, and iron oxide. Photocatalysts can also be semiconductors that support a metal, such as platinum, palladium, rhodium, and ruthenium, strontium titanate, amorphous silicon, hydrogenated amorphous silicon, nitrogenated amorphous silicon, polycrystalline silicon, and germanium, and combinations thereof. Catalysts or photocatalysts can be carbon-based graphene or graphite, as well as carbon-doped semi-conductive or other magnetic material, for example, graphene doped AMO.

The data in Example 1 show good activity of Cu-AMO in the photocatalytic degradation of $NH_3$. Some of the parameters to increase activity include enhanced surface area, optimization of $[Cu^{2+}]$, and resultant morphology. The electronic properties of the catalyst may also be important since the AMO is mixed valence ($Mn^{2+}$, $Mn^{3+}$, $Mn^{4+}$) and possible reduction of $Cu^{2+}$ to $Cu^{1+}$. The most active photocatalysts can be analyzed with X-ray photoelectron spectroscopy to study the oxidation state of the copper in these materials. Catalysts are characterized with X-ray powder diffraction (XRD) to study any crystallinity of the materials, electron diffraction (ED) in a transmission electron microscope (TEM) to study both crystalline and amorphous content of the catalyst, and atomic absorption (AA) for compositions of the catalyst. Semi-quantitative analyses of the solid sample can be done by energy dispersive X-ray analyses in a scanning electron microscope (SEM).

IV. Ballast Water Prototype System

The following describes a prototype design that can be modified as necessary to scale up or to fit into specific ships. The prototype design can process 1,000 cubic meters of ballast water/hour. The final design must be able to process 4,000 to 6,000 cubic meters of ballast water/hour. The overall system must fit into an area that has 8-foot ceilings. The workers must be able to access each unit (each end will have a quick-release hatch, much like a submarine). Units are cylinders with 48-inch outside diameter, so that two units can be stacked in an 8-foot space. The cylinders are about 12 feet long. The disinfection chamber is about 8 feet long and the filtration chamber is about 4 feet long. 90-inch long Xenon bulbs can be used for the disinfection chamber. 3- to 3.5-foot individual filters are used in the filtration chamber. The filtration chamber includes 50 micron filters.

After passing through a pre-filter to remove larger items, the ballast water flows first through the 50-micron filters in the filtration chamber, then enters the disinfection chamber. Each chamber needs its own valve system, preferably with a check valve between the filtration and disinfection chambers. One should be able to empty the filtration chamber with no water loss in the disinfection chamber, or a shut-off sensor in the disinfection chamber should turn off the power when the water is drained. A sensor/power cutoff switch is placed at the highest vertical point inside each chamber. The water level in the filtration chamber will vary because of the backwash cleaning cycle. If the water level within the disinfection chamber drops at all, the power is immediately turned off. There is also a pressure detection switch in both the filtration and the disinfection chambers, so that the system can monitor the differential in water flow (psi) between the two chambers. A UV sensor is placed in the disinfection chamber wall at the highest vertical point inside the disinfection chamber that can detect whether the lights are producing the needed intensity to provide a kill rate of 1 $W/cm^2$ per second of water flow.

Filtration Chamber

A pre-filter filters the water before it enters the ballast water tanks using cross filtration technology to filter out particulate matter ($\geq 50$ μm). The array of filters fit through the quick-release hatch so that they can be readily accessed for servicing (and easily installed). These filters are designed to be cleaned by both pulsing and backwashing.

Pulse Cleaning

The pump pulses the 50-micron filters periodically to remove much of the detritus. Water will still be in the filtration chamber, but the flow will stop momentarily when the spring pulse occurs. The filters will have a differential switch set at a minimal pressure, for example, 10 psi, just to dislodge material on the filter so the filter can continue to function. Only about 10 gallons of disinfection water is required back through each filter in a short burst to dislodge the particulates on the filters. This could be a small centrifugal pump or a pressure valve system. A check valve is need at the inlet for the pulse water pump.

In the spring pulse cleaning, the spring filters will be separated by extending the spring and a backwash pulse will provide a short, minimal water exchange with filtered water from the disinfection chamber to remove material on the spring filters. During a pulse, the detritus in the filter is dislodged for a moment, and then re-attaches itself to the outside of the Cross filter. In theory, this process will make new, clean (i.e., unobstructed) areas available on the Cross filter, so that the filter can remove additional detritus from the ballast water.

Backwash Cleaning

When the timing sensor detects that the pulses are too frequent (more than once per minute), or when the pressure differential between the filtration chamber and the disinfection chamber is greater than 25 psi (meaning that the filters are simply too full of detritus to function properly), then the backwash cleaning cycle will start. For example, if the water pressure in the filtration chamber is 100 psi and the water pressure in the disinfection chamber is >125 psi, the backwash cleaning cycle will be triggered. In the backwash cleaning cycle, the water flow through the filter and the disinfectant chambers stop, and the entire volume of water with all of the suspended "gunk" in the filtration chamber drains through a single high flow automatic cleaning strainer such as the Eaton MCS-500 or MCS-1500 models. The strained water returns to the inlet side of the filtration chamber. The collected 50-micron and larger "gunk" is disposed of as solid waste. The spring filter units are cleaned by a backwash pulse; material will also be drained through the Eaton high flow automatic cleaning strainer. Then the flow of water from the ballast tank begins again. During (or before) the refill, the filters reset to their original position, and the filter chamber process goes back on-line again. The entire drain/backwash/restart process takes only a few minutes, and cleans detritus off the entire outside surface area of the cross filters, so that the pressure differential between the filtration and disinfection units returns to zero. The filter/disinfectant units are programmed to support both the spring pulse and the full backwash cleaning.

Sensors, Switches, and Valves

Sensors, switches and valves are used to control water flow and exposure to the treatment to destroy contaminants. For example, a level switch closes the valve from the ballast water holding tank to the filtration chamber and from the filtration chamber to the disinfection chamber during the cleaning and opens the valve to the untreated ballast water supply and to the disinfection chamber to re-start the flow through the system as soon as the filtration chamber has been emptied. Either check valves or automated activation valves are used to coordinate this entire process.

Other valves include:

A shut-off valve stops the flow of water before the ballast water even enters the unit. This valve shuts off the water for the backwash cleaning cycle and for servicing the unit.

A check valve at the inlet for the pulse water pump.

A check valve to stop the flow of water from each Cross filter (in the filtration chamber) into the disinfection chamber. Each Cross filter functions independently.

A valve at the drain from the filtration chamber to the Eaton high flow automatic cleaning strainer.

A valve from the filtration chamber to the disinfection chamber.

A sensor detects the water level in the filtration chamber. The sensor should be placed at the highest vertical point inside the chamber. A pressure detection switch is used in both the filtration and the disinfection chambers, so that the system can monitor the differential in water flow (psi) between the two chambers.

Disinfection Chamber

If the overall unit is constructed from a material such as CPVC, which is stable and inert in a marine environment, a reflective lining or coating in the disinfection chamber is required to protect the CPVC from the light. The UV light will break down the CPVC. Suitable materials are available from Acree Technologies Incorporated, which specializes in reflective coatings that are saltwater-, high corrosive-, and abrasion-resistant. Directional flaps on the outlet side of the Cross filters insure that the flow of water into the disinfection chamber will follow a circular pattern. This way, the water keeps swirling around (turbulence) to ensure that all of the water is treated by the light.

Sensors, Switches, and Valves

A sensor is used to detect the water level in the disinfection chamber and to turn off the power if the water level drops below a certain height. The sensor/power cutoff switch is placed at the highest vertical point above the topmost bulb in the array inside the chamber, so that if the water level within either chamber drops, the power will be immediately turned off. A pressure detection switch is used in both the filtration and the disinfection chambers, so that the system can monitor the differential in water flow (psi) between the two chambers. In addition, a UV sensor is placed in the disinfection chamber wall at the highest vertical point inside the disinfection chamber that can detect whether the lights are producing the needed intensity to provide the desired kill rate, preferably 1 $W/cm^2$ per second of water flow.

The disinfection chamber has two shut-off valves:

A check valve for each Cross filter to stop the flow of water from the Cross filter into the disinfection chamber.

A valve from the disinfection chamber to the discharge pipe that leads to the ship's exterior.

Light Source/Array Overview

Pulsed light and Xenon bulbs with band pass coating applied to the interior of the quartz sleeves surrounding the light sources are used with quartz sleeves, for example, from Advanced Glass Industries and pulse generators, for example, from Applied Energetics. The lights in their quartz sleeves are arranged in a set of concentric arrays in the disinfection chamber. The set of arrays should fit through the quick-release hatch, so that it can be quickly and easily removed for servicing (and easily installed). Each sleeve has its own light source (a Xenon pulse lamp and associated components). Preferred lights are 60-inch U-shaped, so that all the electronics need to be connected only at one side. 1600-J pulse bulbs are preferable utilized that can produce 1 W/cm$^2$ per second of water flow. This output satisfies any standards the US or IMO set.

The outside dimension of the U-shaped bulb is 3 inches, therefore the inside of the quartz sleeve must be at least 3.25 inches and the sleeve itself will be ¼ inch thick, making the overall size at least 3.75 inches. The cleaning wipers will be able to easily move back and forth to keep the sleeves clean.

The most important parameter in UV system design is UV dose (UV intensity×exposure time), measured in mW/cm$^2$—or in microW/cm$^2$ (1 mW/cm$^2$=1,000 microW/cm$^2$). Therefore, exposure or residence time has to be included as well as the lamp output being considered. Most important is UV transmittance (or absorbance). This is a measurement in a 1-cm path length cell of how much UV light is transmitted (or absorbed) by matter dissolved or suspended in the water. Distilled water is 100% and wastewater, dependent on treatment quality, can range from 20% to 80%. The more UV absorbed, the lower the flow treated per lamp. The table below gives some approximate capacities per lamp at various water qualities to achieve <200 fecal coliforms per 100 ml.

| Water quality BOD/SS (mg/L) | % UV Transmission (1 cm) | Flow per lamp (L/s) |
|---|---|---|
| 30-30 | 40 | 0.5-0.75 |
| 20-20 | 50 | 0.75-1.2 |
| 10-10 | 65 | 1-1.4 |

Each quartz sleeve is coated on the inside with a band gap filter coating that will permit only 254-nm light to pass through. The ends of the quartz sleeve are attached to a pulse generator, much like how a fluorescent light bulb is attached to its ballast. Applied Energetics sells a pulse generator that will activate 8-10 pulse bulbs Bulbs are preferably set to 3 pulses/second. The Xenon bulbs need to provide a range in the UV (185-280 nm). The internal coating will ensure that only 254-nm light is generated, which will break down the DNA/RNA in any living organisms (usually they will die outright, but even if they survive, they will no longer be able to reproduce).

The power generators for the light arrays are positioned outside the disinfection chamber, near the shut-off valves. The quartz sleeves are no more than 4 inches apart (to protect against any light intensity loss due to turbidity). The water moving through the disinfection chamber helps to dissipate the heat produced by the bulbs. Cooled nitrogen gas is constantly circulating inside the quartz sleeves that house the bulbs. The nitrogen flows into and out of each quartz sleeve to a central cooling chamber located outside of each sleeve. The nitrogen gas is cooled via a mini-heat exchanger and then returned to the sleeve. Aside from cooling, the nitrogen gas prevents formation of any oxidation products. The system needs a small circulation pump to circulate the nitrogen gas.

Valves and Sensors—Placement

A valve system is required to shut off the water for servicing. A water level switch that is connected to a sensor that detects the water level above the topmost bulb in the array in the disinfection chamber is also required. The sensor/power cutoff switch should be placed in the chamber wall at the highest vertical point inside the disinfection chamber, so that if the water level within the disinfection chamber drops at all, the power will be immediately turned off. The system includes a pressure detection switch.

A UV sensor is placed in the disinfection chamber wall at the highest vertical point inside the disinfection chamber that can detect whether the lights are producing the needed intensity to provide the required kill rate, for example, 1 W/cm$^2$ per second of water flow. Water is pumped out of the closed off pipe section where the unit is placed. Preferably these are standard pumps that the ship uses to discharge ballast water.

The valves that are utilized include:

A shut-off valve to stop the flow of water before the ballast water even enters the unit. This valve will shut off the water for the backwash cleaning cycle and for servicing the unit.

A check valve for each cross filter to stop the flow of water from the cross filters in the filtration chamber into the disinfection chamber.

A check valve at the inlet for the pulse water pump in the filtration chamber.

A valve at the drain from the filtration chamber to the Eaton high flow automatic cleaning strainer A shut-off valve to stop the flow of water from the disinfection chamber (i.e., leaving the unit) to the discharge pipe that leads to the ship's exterior.

A valve at the drain where we backwash the system.

A check valve at the inlet for the pulse water pump.

The disinfection chamber will have two shut-off valves

A check valve for each Cross filter to stop the flow of water from the Cross filters in the filtration chamber into the disinfection chamber.

A valve from the disinfection chamber to the discharge pipe that leads to the ship's exterior.

Power Generator Placement

In one embodiment, the power generator is placed on the side of the unit, by the shut-off valve for the water supply.

Cleaning Quartz Sleeves in the Light Array

The quartz sleeves must be cleanable with an automatic squeegee system and easily removed for maintenance.

In addition, the appropriate sensors need to be installed to verify the proper light intensity is being applied V. Methods of Use A specific frequency of light at the proper intensity when applied to molecules, optionally in the presence of a catalytic or similar promoter, will dissociate any selected bond, resulting in the destruction or inactivation through atomic dissociation of the molecule. Accordingly, this method can be used to eliminate or inactivate biological contaminants, chemical contaminants, or combination thereof in a sample. The component product gases, elements or chemicals can be purified, stored, utilized or disposed of.

In some embodiments, water comprising target molecules is subjected to dissociation with an energy of dissociation to eliminate or inactivate one or more biological contaminants, chemical contaminants, or combination thereof. In preferred embodiments, the method effectively eliminates chemical pollutants, biological contaminants, and combinations thereof in a contaminated water sample without generating intermediates or byproducts which require further remediation. The method can further include purification, for example, to remove the resultant component products or remove catalyst, if present. In certain embodiments, a sample containing one or more biological contaminants is sterilized using the method described herein.

Ballast water containing one or more chemical contaminants, biological contaminants, or combinations thereof is irradiated with energy at a frequency and intensity in an amount effective to selectively break one or more bonds within one or more target molecules. In doing so, one or more chemical contaminants, biological contaminants, or combinations thereof present in the ballast water are eliminated or otherwise rendered environmentally benign.

In certain embodiments, the ballast water is irradiated at the time of loading, during storage or during discharge. Preferably, the energy source for ballast water irradiation is incorporated into the means for ballast water discharge, such that ballast water treatment operates interruption-free with a high volumetric flow rate of water. In certain embodiments, the ballast water treatment operates interruption-free with a volumetric flow rate of greater than 1,000 cubic meters per hour, more preferably greater than 2,500 cubic meters per hour, more preferably greater than 4,000 cubic meters per hour, more preferably greater than 5,000 cubic meters per hour, most preferably greater than 6,000 cubic meters per hour.

In certain embodiments, the method effectively eliminates chemical pollutants and biological contaminants in ballast water without generating intermediates or byproducts which require further remediation and/or without requiring the addition of chemical reagents.

Duration of the Process

The process typically is conducted until the majority to all target molecules have been dissociated into component products. Examples of duration of time include from a fraction of a second to 10 minutes. In a preferred embodiment, the process is conducted for one minute.

Those skilled in the art will recognize the energy of dissociation source intensity, concentration of sample, and energy of dissociation source energy required will affect the amount of time required for complete dissociation.

Advantages of System

Precise Energy Separation (PES) Technology involves exposing a target pollutant to a burst of specific high intensity energy in order to dissociate it at a molecular level. The system has a low energy input yet produces a high selective energy output. The PES System produces no toxic byproducts, and allows for the dissociation of harmful hydrocarbons or other chemicals identified and regulated in the future, in addition to invasive species.

PES is able to provide deeper penetration to the pollutants than other technologies and can attain up to 100% exposure and a 9 log kill rate of invasive organisms after one second. PES can eliminate virus which needs an exposure of 440,000 μws/cm$^2$ to be killed. The technology is effective in turbid or chemical waters and waters with suspended particles that house small viruses or cancer agents. Existing UV systems cannot resolve these issues because the contaminants in water reduce the transmission of UV light through the water, therefore the destructive rays of UV light does not reach the organisms.

PES systems consume up to 80% less energy than continuous wave mercury UV systems. Short, high energy bursts result in significantly less energy usage compared to the continuous mercury UV cycle. Additionally, PES selects only the wavelength which is needed to kill the invasive organism, thereby not producing unintended byproducts, or unknown photochemical reaction end products, such as oxidants or reducing chemicals as is seen with all electrochlorination systems, which can be more harmful than the original organism or chemical.

The PES system allows engineers to tailor or 'tune' key parameters to the application, including changing the peak power, pulse repetition rate, pulse sequencing, exposure duration, and wavelength or wavelengths (output energy). This unique flexibility helps process engineers, integrators and formulators find the optimal balance between high energy, low heat, short exposure times, flow rates and absolute kill rates.

PES delivers high intensity bursts of energy in less than a second which results in higher throughputs for volume of treatment. This minimal exposure time permits a much higher throughput volume, and allows for a smaller inline, cost effective unit for the treatment of larger volumes, up to 5,000 m$^3$/h. PES can achieve large flow rates with a single unit, allowing costs to scale much better than the current systems of modular systems which increase scalability simply by adding units.

In one embodiment, the PES system uses xenon gas, eliminating the treat of an exposure to the mercury gas used in standard UV systems. PES selects only 254 nm light which will disrupt the DNA of invasive species, thereby creating no oxidizing agents or harmful byproducts such as is found in current proposed systems. PES does not generate potentially dangerous microwaves, nor does it contain mercury.

There are two major cost considerations when choosing a treatment system—capital expenditure and operational expenditure. The estimated capital expenditures of PES are competitive to alternative treatment systems. The operational expenditures (primarily derived from the cost of energy) are very far below the mean for treatment options. It is estimated that the average energy usage for BWT systems is 68 kw per 1000 m$^3$ of processed water with an operating cost of $39 per 1000 m$^3$/hr. By comparison, the energy usage and operating costs for PES are estimated at 13.5 kw per 1000 m$^3$ and $8 per 1000 m$^3$/hr, respectively.

Certain treatment options have a range of acceptable temperature ranges in which they are effective. For example, electrolytic disinfection, also known as electro-chlorination, cannot function below 5° C. or 41° F. This makes it impractical for use on ships which must transport cargo in cold climates (or even temperate climates in winter). The PES System can operate equally effectively at any temperature which a vessel may encounter on the surface of the Earth.

EXAMPLE 1

Photocatalytic Generation of $N_2$ from $NH_3$

A pulse of light of a particular frequency and intensity of a quick duration (nano or pico-second burst or similar duration providing a multi-photon discharge) is used to photodissociate ammonia to nitrogen and hydrogen with no production of any intermediates or oxidized by-products such as nitrate, nitrite or nitrous oxide. This is accomplished by the use of the correct promoter, light frequency energy and/or specific input of the correct bond dissociation energy or energies for ammonia with a proper intensity which provides for a multiphoton or frequency energy exposure of the ammonia molecule. A particular molecular bond having a precise energy of bond or dissociation in each target molecule is broken by photo-dissociation, only due to the light pulse being at the proper frequency and intensity with the proper number of photons attached within the necessary time to prevent reconnection, thereby producing harmless nitrogen and hydrogen, thereby removing the harmful ammonia from the water. A benefit of this process is that the off gases or cleaved atoms can be collected and used as energy sources as is in the situation with hydrogen in a fuel cell or hydride engine or as a nutrient.

Materials and Methods

A three ounce solution of 1 ppm ammonia in water was irradiated with a xenon curing bulb attached to a pulse generator which supplied 3 pulses per second. Optionally, one of the following catalysts were included: Pt/TiO$_2$ (platinized titania), TiO$_2$ (Titanium oxide), Cu-AMO (Copper-doped Amorphous Manganese Oxide, AMO (Amorphous Manganese Oxide), and Cu—Ce—Co (Copper-Cerium-Cobalt). The xenon curing bulb was set to the low ultraviolet range from 185 nm to 280 nm. The solutions were tested for component gases after one second and one minute. The resultant gases of dissociation, N$_2$ (g) and H$_2$ (g), were measured by gas chromatography (GC), mass spectrometry (MS), ion chromatography, and gas chromatography-mass spectrometry (GC-MS) methods. Separation and determination of ammonia (NH$_3$), nitrite (NO$_2^-$) and nitrate (NO$_3^-$) in single sample solutions was performed as follows:

NH$_4^+$ was converted to NH$_3$ in solution using NaOH.
NH$_3$ was reduced to NO$_2^-$ using FeSO$_4$.
NO$_2^-$ was oxidized to NO$_3^-$ using Al—Cu—Zn (Devarda's alloy)

Results

Preliminary results for the degradation of ammonia in water are shown below in Tables 1-3. The products were analyzed by gas chromatography (GC), mass spectrometry (MS), ion chromatography, and gas chromatography-mass spectrometry (GC-MS) methods.

TABLE 1

Generation of N$_2$ from NH$_3$ via Photocatalysis

| Sample | Trial | O$_2$ peak area | N$_2$ peak area | Total Peak Area | N$_2$ Peak Ratio[a] | Peak Ratio[b] |
|---|---|---|---|---|---|---|
| 100% N$_2$ | 1 | 0 | 1557.491 | 1557.491 | 1.00 | 0 |
| | 2 | 2.3732 | 1557.4989 | 1601.3 | 0.972 | 656.286 |
| Air | 1 | 149.2122 | 609.9426 | 759.1548 | 0.803 | 4.087 |
| | 2 | 58.9228 | 236.4986 | 295.4214 | 0.800 | 4.013 |
| Blank[c] | 1 | 9.0868 | 32.8381 | 41.9249 | 0.783 | 3.613 |
| | 2 | 2.9284 | 9.2394 | 12.1678 | 0.759 | 3.150 |
| Platinized TiO$_2$ | Day 1 | 115.4792 | 552 | 679.3385 | 0.813 | 4.782 |
| | Day 2, Trial 1 | 5.0618 | 23.9787 | 39.1785 | 0.612 | 4.737 |
| | Day 2, Trial 2 | 5.5956 | 25.2047 | 30.8003 | 0.818 | 4.504 |

[a]N$_2$ Peak Ratio = (N$_2$ Peak Area/Total Peak Area)
[b]Peak Ratio = (N$_2$ Peak Area/O$_2$ Peak Area)
[c]O$_2$ and N$_2$ peaks observed are attributed to sample contamination with air due to the limitation of manual injection despite precautions. Online injection avoids this contamination.
Trial 1 = 1 second; Trial 2 = 1 minute

TABLE 2

Photocatalytic Data for Various Photocatalysts[a]

| Catalyst | Trial | NH$_3$ | NO$_2^-$ | NO$_3^-$ |
|---|---|---|---|---|
| Platinized TiO$_2$ | 1 | 0.0574 | 0.0125 | 0.0137 |
| | 2 | 0.0574 | 0.0123 | 0.0135 |
| | 3 | 0.0572 | 0.0122 | 0.0134 |
| | Average | 0.0573 | 0.0123 | 0.0135 |
| TiO$_2$ | 1 | 0.1547 | 0.0101 | 0 |
| | 2 | 0.1548 | 0.0106 | 0 |
| | 3 | 0.1550 | 0.0108 | 0 |
| | Average | 0.1548 | 0.0105 | 0 |
| Cu-AMO | 1 | 0.1322 | 0 | 0 |
| | 2 | 0.132 | 0 | 0 |
| | 3 | 0.1318 | 0 | 0 |
| | Average | 0.132 | 0 | 0 |
| AMO | 1 | 0.736 | 0 | 0 |
| | 2 | 0.7358 | 0 | 0 |
| | 3 | 0.7356 | 0 | 0 |
| | Average | 0.7358 | 0 | 0 |
| Co—Ce—Cu | 1 | 0.3926 | 0 | 0 |
| | 2 | 0.3924 | 0 | 0 |
| | 3 | 0.3922 | 0 | 0 |
| | Average | 0.3924 | 0 | 0 |

[a]Units are in Absorbance Units

TABLE 3

NH$_3$ Concentrations following Photocatalysis with Various Catalysts

| Catalyst | Average Calculated NH$_3$ Concentration Following Photocatalysis (mM) | Percent Decrease from Starting NH$_3$ Concentration (%) |
|---|---|---|
| None | 0.19 | 0 |
| Platinized Titania | 0.029 | 84.6 |
| TiO$_2$ | 0.080 | 57.5 |
| Cu-AMO | 0.068 | 63.9 |
| AMO | 0.388 | −104.2 |
| Cu—Ce—Co | 0.206 | −8.93 |

Discussion

From Tables 1-3 and FIG. 1, a significant decrease in NH$_3$ concentration in Pt/TiO$_2$ from 0.1 mM to 0.029 mM is observed. This is an indication of the conversion of ammonia to other nitrogen-containing species. The photocatalytic activity of AMO is impressive. However, the data clearly indicate photocatalytic oxidation of NH$_3$ in aqueous solution to the undesirable toxic nitrate and nitrite oxygenated products. Doping the AMO with copper (Cu$^{2+}$ ions) markedly increased the selectivity for 100% conversion of ammonia to nitrogen gas.

We claim:

1. A method for treating ballast water comprising irradiating the ballast water comprising target molecules with an effective amount, intensity and frequency of energy to specifically dissociate one or more target bonds in the target molecules to separate the target molecules into component products without producing any by-products and without re-association of the one or more target bonds.

2. The method of claim 1, wherein the energy is selected from the group consisting of chemical, kinetic, potential, magnetic, thermal, sound, light, electrical, piezoelectric, and electrochemical energy.

3. The method of claim 1, wherein the energy is in the form of light irradiation, acoustic energy, or electromagnetic radiation.

4. The method of claim 3, wherein the energy is amplified.

5. The method of claim 1, wherein the energy is applied by an energy source selected from the group consisting of frequency generators, electrical generators, plasma generators, arc lamps, pulse generators, amplifying generators, tunable lasers, ultraviolet lamps, ultraviolet lasers, pulse ultraviolet generators, ultrasound generators, and combinations thereof.

6. The method of claim 1, wherein the water is irradiated in the absence of a catalyst.

7. The method of claim 1, comprising providing a catalyst which enhances dissociation of the one or more target bonds which are irradiated.

8. The method of claim 7, wherein the catalyst is a semi-conductive material or magnetic material.

9. The method of claim 7, where in the catalyst is selected from the group consisting of titanium oxides ($TiO_2$), platinized titania, amorphous manganese oxide, copper-doped manganese oxide, titanium dioxide, strontium titanate, barium titanate, sodium titanate, cadmium sulfide, zirconium dioxide, and iron oxide.

10. The method of claim 7, wherein the catalyst is selected from the group consisting of platinum, palladium, rhodium, ruthenium, strontium titanate, amorphous silicon, hydrogenated amorphous silicon, nitrogenated amorphous silicon, polycrystalline silicon, germanium, and combinations thereof.

11. The method of claim 7, wherein the catalyst is selected from the group consisting of carbon-based graphene or graphite, carbon-doped semi-conductive material, or carbon-doped magnetic material.

12. The method of claim 1, wherein the water contains a chemical contaminant.

13. The method of claim 12, wherein the chemical contaminant is selected from the group consisting of alkyl sulfonates, alkyl phenols, ammonia, benzoic acid, carbon monoxide, carbon dioxide, chlorofluorocarbons, dioxin, fumaric acid, grease, herbicides, hydrochloric acid, hydrogen cyanide, hydrogen sulfide, formaldehyde, medicines, methane, nitric acid, nitrogen dioxide, nitrates, nitrites, ozone, pesticides, polychlorinated biphenyls, oil, sulfur dioxide, sulfuric acid, volatile organic compounds, and combinations thereof.

14. The method of claim 1, wherein the water contains a biological contaminant.

15. The method of claim 14, wherein the biological contaminant is selected from the group consisting of proteins, polysaccharides, polynucleotides, and combinations thereof.

16. The method of claim 14, wherein the biological contaminant is selected from the group consisting of bacteria, protozoa, viruses, plants, algae, plankton, animal cells, and combinations thereof.

17. The method of claim 16, wherein the target molecule is a portion of a biomolecule essential for the function and/or survival of the biological contaminant.

18. The method of claim 17, wherein the target molecule is selected from the group consisting of proteins, DNA, RNA, and combinations thereof.

19. The method of claim 1, wherein the ballast water is filtered prior to treatment, during intake or storage.

20. The method of claim 1, wherein the ballast water is treated during ballast water discharge.

21. The method of claim 1, wherein the ballast water treatment operates interruption-free with a volumetric flow rate of greater than or equal to 1,000 cubic meters per hour.

22. The method of claim 1, wherein treatment of the ballast water is effective to sterilize the ballast water sample.

23. The method of claim 19, further comprising filtration of the ballast water to remove macroscopic contaminants.

* * * * *